(12) United States Patent
Shrestha et al.

(10) Patent No.: US 11,515,745 B2
(45) Date of Patent: Nov. 29, 2022

(54) ROTOR WITH SURFACE MOUNTED MAGNETS

(71) Applicant: ABB Schweiz AG, Baden (CH)

(72) Inventors: Ghanshyam Shrestha, Cary, NC (US); Colin Tschida, Durham, NC (US); Paul Humphries, Market Drayton (GB)

(73) Assignee: ABB Schweiz AG, Baden (CH)

( * ) Notice: Subject to any disclaimer, the term of this patent is extended or adjusted under 35 U.S.C. 154(b) by 201 days.

(21) Appl. No.: 16/008,742

(22) Filed: Jun. 14, 2018

(65) Prior Publication Data
US 2019/0386531 A1    Dec. 19, 2019

(51) Int. Cl.
*H02K 1/278* (2022.01)
*H02K 1/30* (2006.01)

(52) U.S. Cl.
CPC ............. *H02K 1/278* (2013.01); *H02K 1/30* (2013.01)

(58) Field of Classification Search
CPC ............ H02K 1/278; H02K 1/30; H02K 1/28; H02K 21/14; H02K 21/222; H02K 21/044; H02K 21/22; H02K 1/2773; H02K 1/27; H02K 1/276; H02K 1/2766; H02K 1/2786; H02K 1/2706; H02K 1/22; H02K 1/2793; H02K 1/146; H02K 1/274; H02K 1/148
See application file for complete search history.

(56) References Cited

U.S. PATENT DOCUMENTS

| 4,942,324 A | * | 7/1990 | Ooyama | H02K 1/26 310/216.007 |
| 7,701,100 B2 | * | 4/2010 | Morel | H02K 1/278 310/156.19 |
| 8,310,126 B1 | * | 11/2012 | Hopkins | H02K 1/148 310/156.19 |
| 2005/0184611 A1 | * | 8/2005 | Rinholm | H02K 1/278 310/156.21 |
| 2007/0024141 A1 | * | 2/2007 | Drexlmaier | H02K 1/278 310/156.19 |
| 2007/0103023 A1 | * | 5/2007 | Tapper | H02K 1/2773 310/156.19 |
| 2016/0190883 A1 | * | 6/2016 | Maki-Ontto | H02K 1/278 310/156.19 |

FOREIGN PATENT DOCUMENTS

EP          0569594 B1 * 11/1993 .............. H02K 1/27

* cited by examiner

*Primary Examiner* — Bryan R Perez
(74) *Attorney, Agent, or Firm* — Leydig, Voit & Mayer, Ltd.

(57) ABSTRACT

A rotor for a permanent magnet motor, including a rotor body having a cylindrical surface having a circumference. A plurality of magnets are disposed on the cylindrical surface at spaced intervals at the circumference, each of the magnets having a base disposed on the cylindrical surface and a top oriented radially away from the base, a sloping front side and a sloping rear side defining with the base and top an isosceles trapezoid shape in a cross sectional plane normal to an axis of rotation of the rotor, the isosceles trapezoid shape being broader at the base. A plurality of magnet retainers, each magnet retainer disposed between a neighboring pair of the plurality of magnets, include angled faces that engage respective front and rear sides of adjacent pairs of the plurality of magnets.

13 Claims, 5 Drawing Sheets

ROTOR WITH SURFACE MOUNTED MAGNETS

TECHNICAL FIELD

The present disclosure relates to electrical machines using permanent magnets such as surface mounted permanent magnet synchronous motors (PMSM) and, more particularly, to securement of magnets on PMSM rotors and methods of assembly thereof.

BACKGROUND

In a permanent magnet synchronous machine, a magnetic field is generated using permanent magnets installed on or around a rotor of the machine. A permanent magnet is a component or a plurality of separate components manufactured from a magnetically hard material and is able to retain its magnetism permanently after magnetization. Permanent magnets are manufactured, for example, from an AlNiCo mixture that includes aluminum, nickel, cobalt and steel, or from ceramic materials or rare earth metals.

The permanent magnets are positioned on the surface of the rotor facing an air gap defined between the rotor and stator parts of the machine. The rotor includes a magnetic core which is most often made of ferromagnetic iron sheets assembled into a sheet core extending throughout the rotor's length. While the permanent magnets are attracted to the steel core of the rotor, the centrifugal force created by the rotation of the rotor tends to pull the magnets off of the rotor. The mechanical structure and the fastening of the magnets are affected by factors such as the forces imposed on them during operation, which includes the size and operating speed of the electrical machine and exposure to heat.

A characteristic method of attaching permanent magnets to the rotor surface facing the air gap is to adhesively bond the permanent magnets to the rotor surface and optionally install a supporting binding made of, for example, carbon-fiber reinforced plastic around the rotor. The assembly of such surface mounted permanent magnet rotors involves a certain cost and complexity. While gluing is a good option for some machines in medium speed machines, higher speed machines typically use banding due to the higher stresses involved. Such banding can make the machine expensive and also increases the machine air gap. It is especially important to ensure a secure connection between magnet and rotor in medium and high speed surface mounted rotors with ceramic magnets. For at least these reasons, securement of magnets on a rotor is a consideration of rotor design.

SUMMARY OF THE DISCLOSURE

One aspect of the disclosure is a rotor for a permanent magnet motor, including a rotor body having a cylindrical surface having a circumference. A plurality of magnets are disposed on the cylindrical surface at spaced intervals at the circumference, each of the magnets having a base disposed on the cylindrical surface and a top oriented radially away from the base, a sloping front side and a sloping rear side defining with the base and top an isosceles trapezoid shape in a cross sectional plane normal to an axis of rotation of the rotor, the isosceles trapezoid shape being broader at the base. A plurality of magnet retainers, each magnet retainer disposed between a neighboring pair of the plurality of magnets, include angled faces that engage respective front and rear sides of adjacent pairs of the plurality of magnets.

Further and alternative aspects and features of the disclosed principles will be appreciated from the following detailed description and the accompanying drawings. As will be appreciated, the principles related to load carrying members for work machines disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
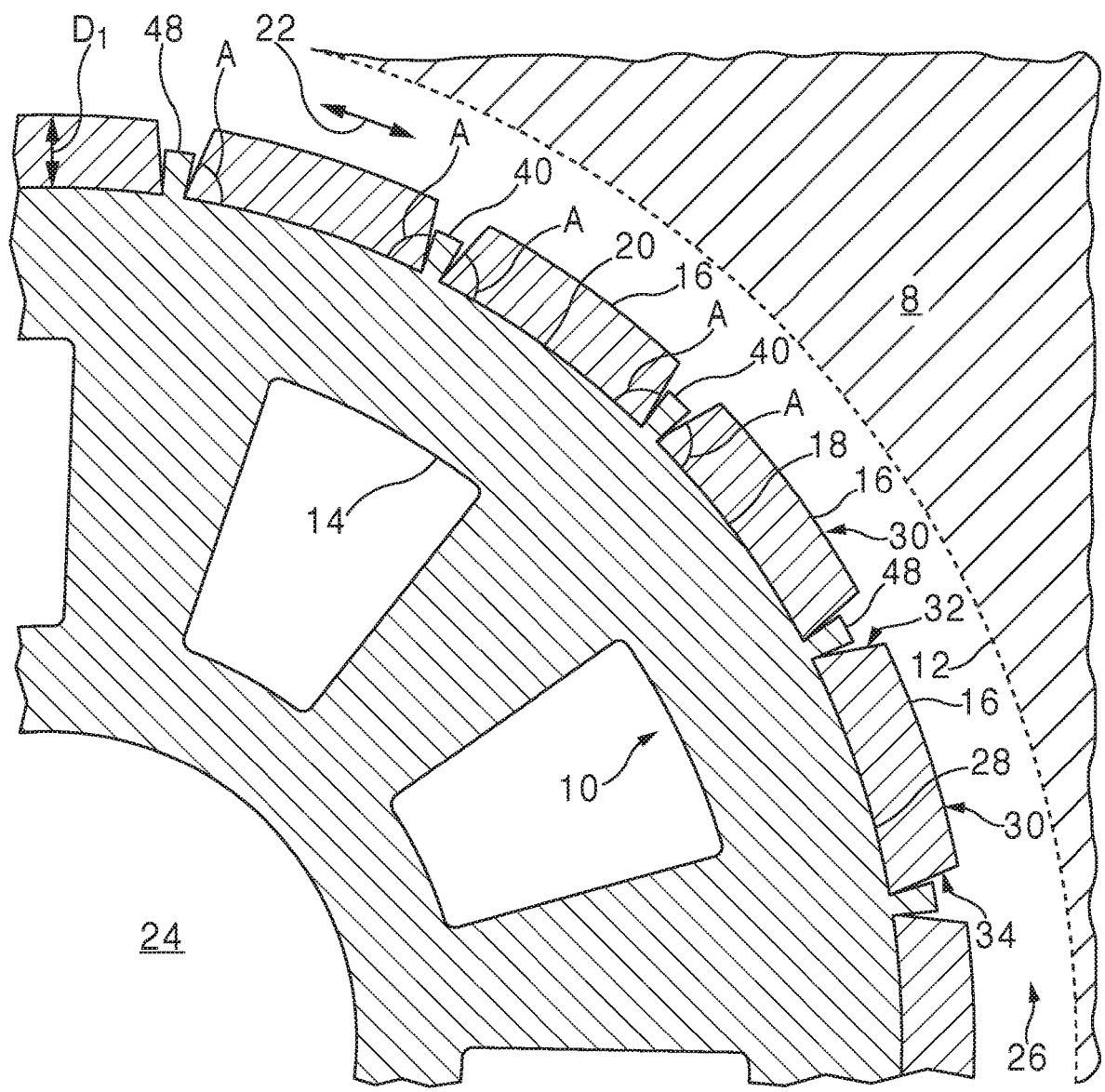
FIG. 1 is a partial side view of a rotor and stator of a permanent magnet synchronous machine according to an embodiment of the disclosure.

FIG. 1 illustrates a partial illustration of an exemplary embodiment of a permanent magnet synchronous machine 8 where the rotor 10 is disposed inside a stator 12 (the inner circumference of the stator is marked with the dashed line). The stator is manufactured and configured in a conventional manner as well as components of the machine 8 with the following improved features.

The rotor 10 includes a magnetic frame or rotor body 14 that, in one embodiment, is formed from magnetically conductive laminations, for example, by arranging a plurality of sheets as a sheet pack forming the length of the rotor in a well-known manner. Other non-laminated rotor configurations are contemplated. The rotor's magnetic frame is fastened, directly or via the rotor center 24, onto the synchronous machine's shaft (not shown) in a well-known manner.

According to the synchronous machine's number of poles, a number of permanent magnets 16 are positioned on the outer circumference 18 of the magnetic frame of the rotor 10. In the lengthwise (axial) direction of the synchronous machine, there are several separate permanent magnets 16 substantially covering the length of the entire rotor (e.g., FIG. 4). Each permanent magnet 16 includes an undersurface 20, which is configured to fit on the outer surface 18 of the rotor's magnetic frame 14. Depending on the manufacturing method used to shape the magnets 16, and also the shape and construction of the rotor 10, the undersurface 20 may have any appropriate shape, including a flat shape. In the illustrated embodiment, the undersurface 20 is shown to be slightly curved, i.e., concave, corresponding to the curvature of the outer circumference 18 of the rotors magnetic frame. When installed around the rotor 10 shown in FIG. 4, the concave undersurface 20 eliminates the need for washers or other means of adapting the fit of the magnets to the rotor 10.

The permanent magnet 16 may consist of two or more separate pieces. In one embodiment, the permanent magnet 16 consists of three separate pieces 116A, 116B, 116C (FIG. 4) that are placed adjacent to each other and jointly comprise a single permanent-magnet pole. The permanent magnet pieces 16 of a single pole are formed so that the N-pole (North) of each piece faces the rotor body 14 and the S-pole (South) faces the air gap 26 and the stator 12 as illustrated, or correspondingly, the S-pole faces the rotor body and the N-pole faces the air gap 26 and the stator 12. The adjacent permanent-magnet pieces within a pole may be glued together at their lateral surfaces using a suitable adhesive.

Figure 2:
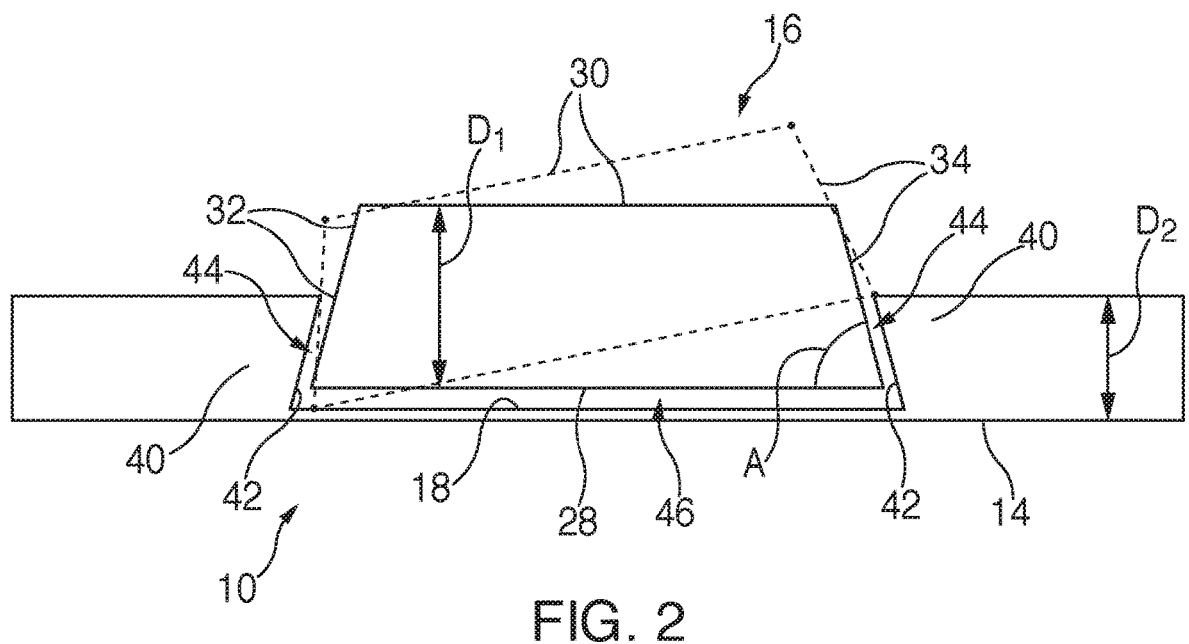
FIG. 2 is a close up side view of a representation of an interconnection between a rotor and a magnet.
Figure 3:
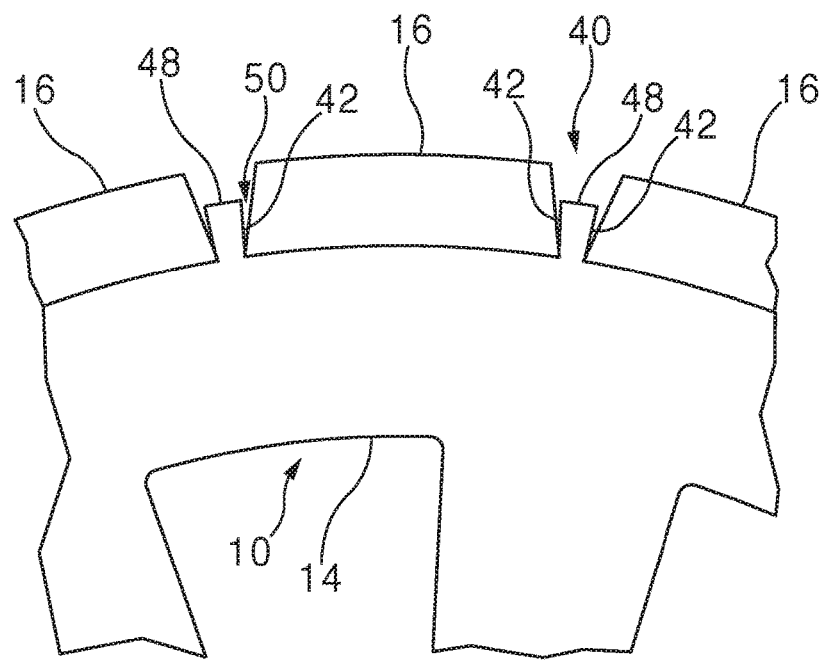
FIG. 3 is a close up side view of a further interconnection between a rotor and magnet.

In addition to the optional concave undersurface 20, the surface mounted magnets 16 are shaped so that there is an acute angle "A" at each corner of the base 28 of each magnet as shown in FIGS. 1-3. For purposes of the present disclosure, acute means an angle of less than 90°. The angle A has the effect that each magnet 16 is wider at the base 28 at the bottom surface 20 than at the outer or top 30. The angle A is created by the first, front, or leading side 32 of each 16 magnet becoming closer to the second, rear, or trailing side 34 as the sides 32, 34 slope inwardly in the direction from the bottom 28 towards the top 30 to create two angled faces on the sides of each magnet 16. Furthermore, in one embodiment, each of the sides 32, 34 is planar the entire distance from bottom 28 to top 30, but the sides 32 and 34 can also have a non-planar shape such as a convex or concave shape that is made from a single curved surface or a series of flat surfaces disposed at angles relative to one another. For example, the profile of the sides 32 and 34 can be semicircular, triangular, semi-hexagonal and the like. In a general aspect, the described configuration of each of the magnets 16 may be referred to as having a "dovetail" shape, which includes any type of planar or non-planar side profile of the sides 32 and 34.

FIG. 2 illustrates the configuration of a magnet 16 wherein the "before," orientation (before installation) is shown as an outline and the "after" orientation of the magnet (after installation) is shown in solid. The magnet 16 includes a top 30, a bottom 28 and sides 32, 34 defining a dovetail or isosceles trapezoid shape in cross section. The trapezoid shape includes acute angles A.

The rotor body 14 also includes magnet retention features, which in FIG. 2 are as structures with sloping walls 42 that are formed at an angle that creates a parallel or nearly parallel relationship with sides 32, 34. When installed, the fit of the magnet 16 to the sloping walls 42 may define a gap 44 at each end of the magnet that is subsequently filled with a suitable adhesive or resin that functions to secure the magnet in position and prevents the magnet from being ejected from the rotor body 14. It should be understood that when the magnet 16 is glued and potted into position on the rotor body 14, the effect of rotating the rotor 10 creates an outward force on the magnets and loads the adhesive in the gap 44. The shape of the magnet 16 and the fit of the magnet to the walls 42 mechanically holds the magnet on the rotor body 14.

The walls 42 and sides 32, 34 may be configured with a cooperatively matching geometry as in FIG. 2, so as to provide the gap 44 with a constant, rectangular cross-section. Accordingly, then the rotor 10 is rotated the magnets 16 load the adhesive in the gap 44 evenly across the entire joint, which spreads the stresses on the adhesive evenly, may permit higher operating speeds.

The height D2 of the walls 42 may be less than or equal to the height D1 of the magnet 16. The spacing between the walls 42 may be specified so as to permit the magnet 16 may be tipped as shown in the "before" orientation and dropped radially into the socket 46 defined by the walls and the outer surface of the rotor body 14. To aid the "drop in" process, the magnets 16 may be cooled to shrink the dimensional size thereof or the rotor 10 may be heated or both. Alternatively, the magnet 16 may be installed axially into the socket. Either of these methods may be performed by a robotic device in an automated process.

Figure 5:
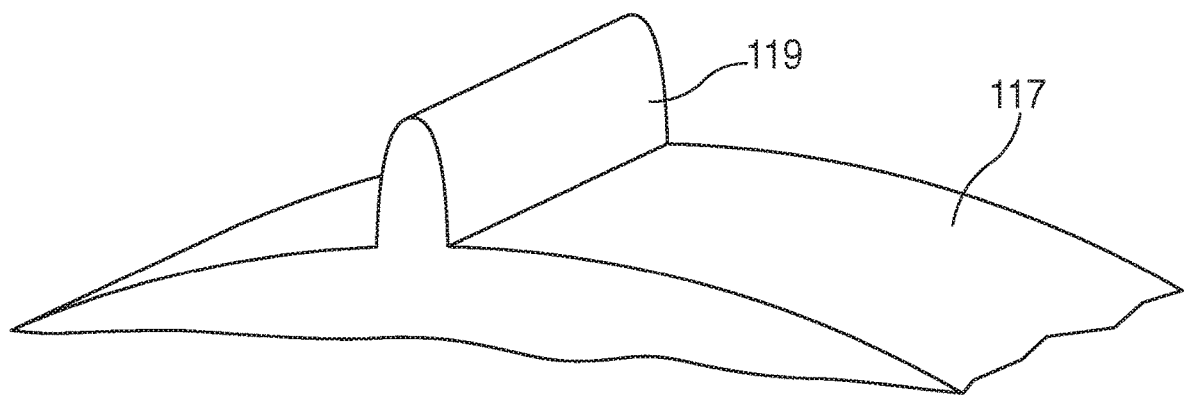
FIG. 5 is partial perspective view of a guide lamination.

FIGS. 1, 3, and 5 illustrate embodiments of a rotor body 14 including magnet retainers 40 including radially extending fingers 48. The fingers 48 function to position and retain the magnets 16 on the rotor 10.

The fingers 48 include walls 42 that are angled such that the distal ends, the ends radially spaced apart from the rotor 10, of the fingers are wider than the proximal ends, which proximal ends are located at the point of attachment of the fingers to the rotor body 14. The relationship of the magnet sides 32, 34 to the walls 42 creates a space 50 that is filled with adhesive or resin to fix the magnets in position, a technique referred to as "potting." The radial length D2 of each finger 48 may be about equal to or less than the radial height D1 of magnets 16.

The rotor back iron 14 is either solid (one-piece construction) or made of a plurality of laminations and can be designed with the fingers 48 as shown in FIG. 3. Other constructions of a rotor are also contemplated, for example, fingers of different radial heights and shapes. The radial height D2 of each finger 48, may be less than half of the height D1 of the magnet 16, which reduces the leakage flux in the magnet. However, taller fingers 48 will also be effective in securing the magnets. The fingers 48 may be smooth-sided or may include a non-smooth texture, such as ribs, to provide grip to the magnets and adhesive. In an embodiment where the rotor body 14 is formed of a solid, unitary, one-piece construction, the fingers 48 may be formed integrally as part of the rotor body as in FIGS. 1 and 3. Additional features could also be added to the magnets such as dimples, a rough texture, ribs, slots, knurling and the like to strengthen the adhesive bond between the magnets 16 and the fingers 48 and/or the rotor back iron or body 14.

Figure 4:
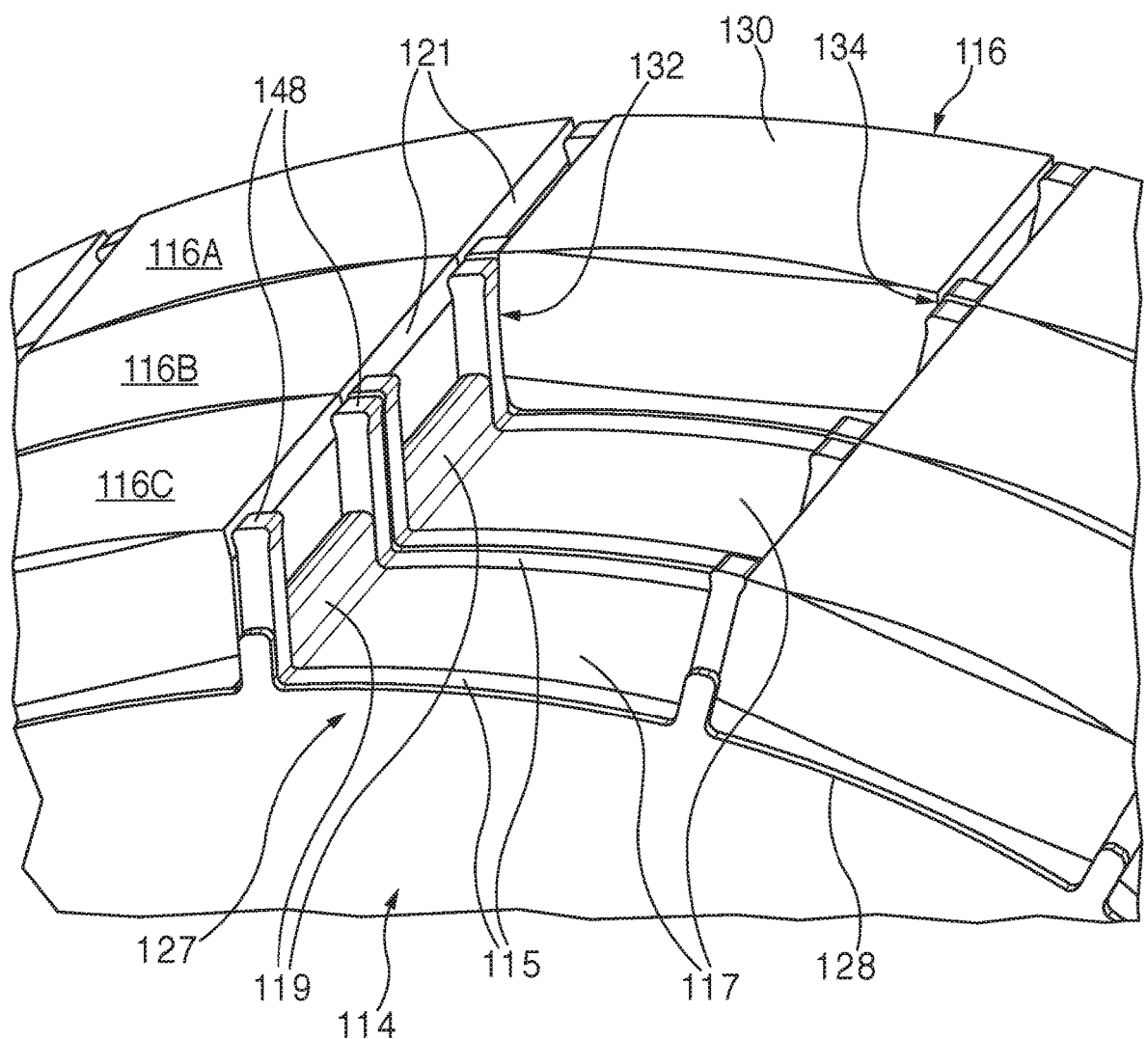
FIG. 4 is an alternative embodiment of a rotor and magnet assembly.

In some electrical machine devices it is not desirable to configure the shape of the magnets as dovetails and the rotor body 14 may be formed of laminations shown in FIG. 4. In one embodiment, with a laminated rotor body 114, a pair of retention laminations 115 with fingers 148 formed thereon is interleaved with a guide lamination 117 with a guide stub 119 formed thereon. The magnets 116 are generally rectangular, with a layer of adhesive 128 affixing them to the rotor body 114. The layer of adhesive 128 may conform to the outer curvature of the rotor body 114. The magnets 116 further include tops 130 that include bevels 121 formed at the junction of the top and sides 132, 134. The bevels 121 permit the fingers 148 to interact with and retain the magnets 116 in position on the rotor body 114.

Figure 6:
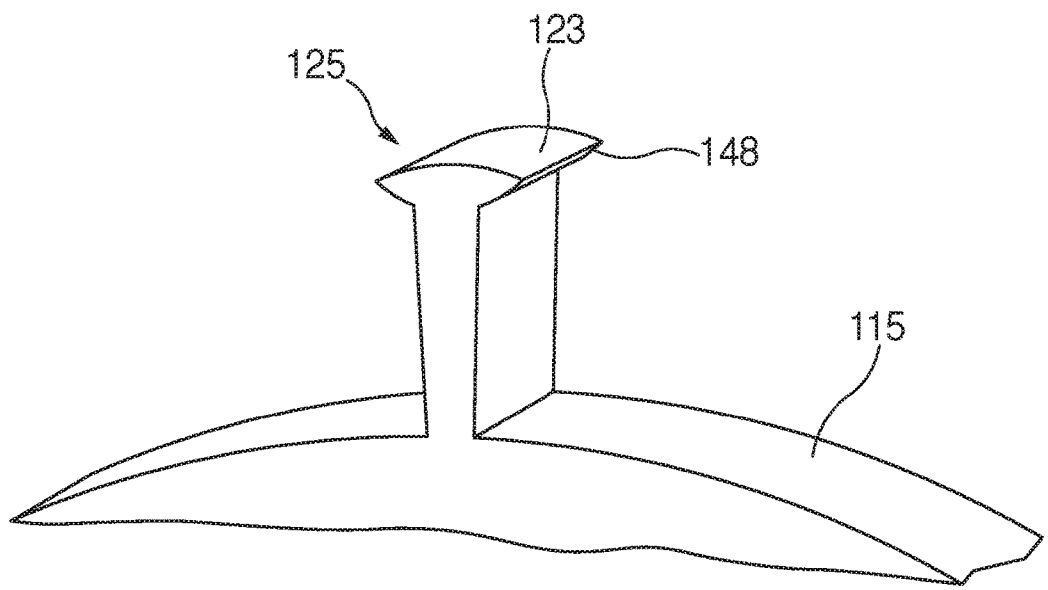
FIG. 6 is partial perspective view of a retention lamination.

Guide stubs 119 of guide laminations 117, as shown in FIG. 5, are rectangular tab shapes that may extend a lesser radial distance relative to the fingers 148 of the retention laminations 115, as shown in FIG. 6. The fingers 148 each have a flared portion 123 formed at a radially distal end thereof formed on the free end 125 of each finger. The flared portion 123 contacts bevels 121 of adjacent magnets 116 to retain the magnets in position.

In terms of arrangement, each rotor body 114 includes a lamination set 127 including one pair of retention laminations 115 with a guide lamination 117 sandwiched therebetween. In an embodiment, a rotor body 114 may include one, two, three or more lamination sets 127. FIG. 4 depicts a rotor body 114 with three lamination sets 127.

Figure 7:
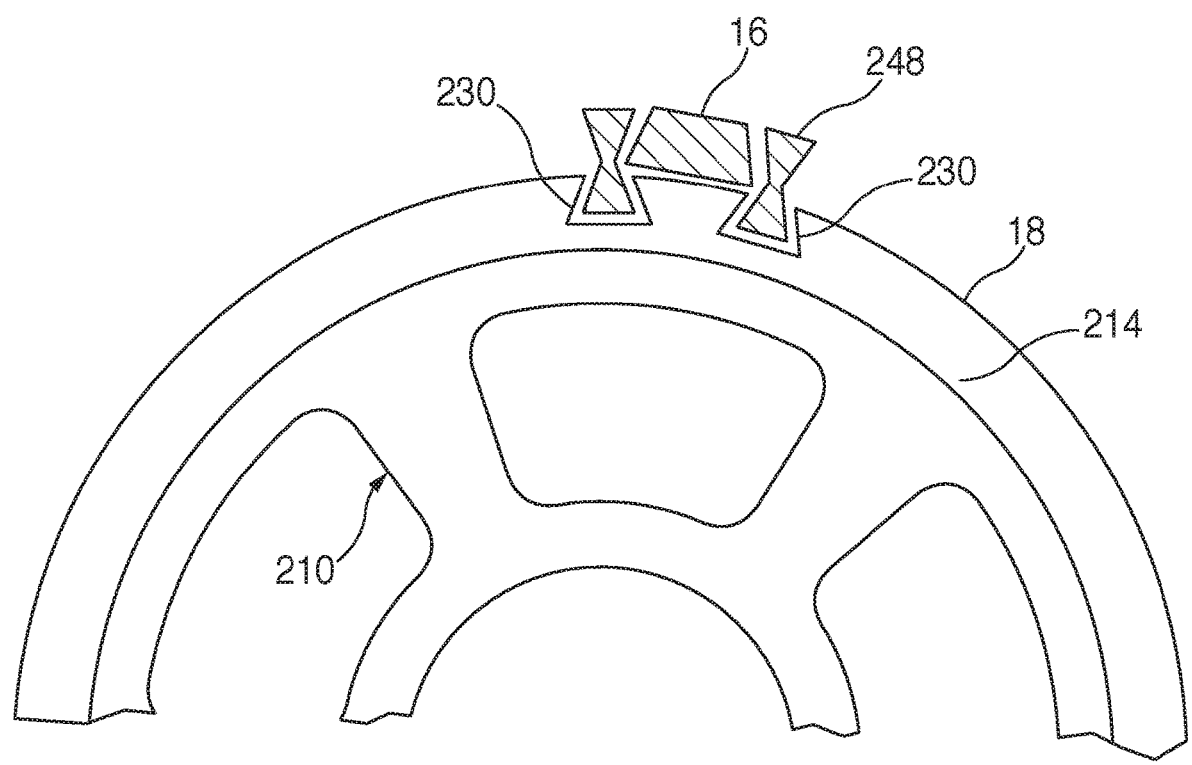
FIG. 7 is another alternative embodiment of a rotor and magnet assembly.

FIG. 7 shows an alternative rotor 210 and rotor body 214. The rotor body includes a plurality of spaced dovetail slots 230, each of which is sized and shaped to receive a correspondingly shaped and sized finger 248. The dovetail slots 230 hold the fingers 248 on the rotor body 214 in a spaced configuration that is sized to receive magnets 16, wherein the magnets include the configuration described above in connection with FIG. 1-3. The fingers 248, therefore include a dovetail shape that engages and is held by the dovetail slots 230, narrowing as the slot narrows toward the outer circumferential surface 18 of the rotor body 214 and again widening as the finger extends radially outwardly. In the present embodiment, the fingers 248 may be extruded in the illustrated cross-sectional shape and may be inserted into a corresponding slot 230 axially. Then, the magnets 16 may be either inserted axially into the spaces defined between adjacent fingers 248 or dropped in as shown in FIG. 2.

When assembling a rotor as described above, fast-setting adhesive may be used to perform the initial securement of magnets in position when unmagnetized magnets are used. If magnetized magnets are used, the magnets are held in position by the interaction with the fingers and the magnetic attraction between the magnet and rotor, and therefore do not require any other means of holding the assembly together. After fixing the magnets in position with or without adhesive, an adhesive can be applied between the fingers and the magnets thus securing the magnets in position to pot the assembly if desired. The illustrated configuration of magnets and finger-shaped magnet retention features are suitable for many kinds of surface mounted magnet devices, such as arc, bread-load modified arc, and so on.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A rotor for a permanent magnet motor, comprising:
    a rotor body having a cylindrical surface having a circumference and a longitudinal length;
    a plurality of magnets disposed on the cylindrical surface, the plurality of magnets including separate magnet pieces disposed along the cylindrical surface at spaced intervals around the circumference of the rotor body and also along the longitudinal length of the rotor body, and wherein each of the separate magnet pieces in the plurality of magnets has a base disposed on the cylindrical surface and a top oriented radially away from the base, a sloping front side and a sloping rear side defining with the base and top an isosceles trapezoid shape in a cross sectional plane normal to an axis of rotation of the rotor and the longitudinal length, the isosceles trapezoid shape being broader at the base; and
    a plurality of magnet retainers, each of the magnet retainers disposed between a neighboring pair of the separate magnet pieces in the plurality of magnets, each of the magnet retainers including angled faces that engage respective front and rear sides of adjacent pairs of the separate magnet pieces in the plurality of magnets;
    wherein a minimum spacing defined between two adjacent magnet retainers is larger than a dimension of each of the separate magnet pieces, the dimension extending between one of the sloping front or rear side and an opposite edge on the cross sectional plane, such that:
        each of the separate magnet pieces in the plurality of magnets is installable generally radially into the rotor body between two previously installed or formed adjacent magnet retainers, and
        a gap is defined between each of the separate magnet pieces and the respective magnet retainers, into which an adhesive is added to secure the plurality of magnets onto the rotor body,
    wherein the rotor body is comprised of a plurality of retention laminations and a plurality of guide laminations,
    wherein each of the retention laminations includes a plurality of fingers that are sized and shaped to engage and retain each of the separate magnet pieces of the plurality of magnets,
    wherein each of the guide laminations includes a plurality of guide stubs,
    wherein the guide stubs extend a distance radially away from the cylindrical surface less than that of the fingers,
    wherein each of the guide laminations is flanked by one of the retention laminations.

2. The rotor of claim 1, wherein the angled faces are planar.

3. The rotor of claim 2, wherein the angled faces extend a portion of the distance between the base and the top.

4. The rotor of claim 2, wherein the angled faces extend the entire distance between the base and the top.

5. The rotor of claim 1, wherein the magnet retainers comprise fingers that are formed as separate pieces from the rotor body.

6. The rotor of claim 5, wherein the fingers include a dovetail shape and the rotor body includes dovetail slots that are each sized and shaped to receive and retain the dovetail shape of one of the fingers.

7. The rotor of claim 1, wherein the spacing between neighboring ones of the plurality of magnet retainers is greater than the width of each of the separate magnet pieces at the base.

8. The rotor of claim 1, wherein the spacing between neighboring ones of the plurality of magnet retainers is less than the width of each of the separate magnet pieces at the base.

9. The rotor of claim 1, wherein the angled faces of the plurality of magnet retainers are smooth.

10. The rotor of claim 1, wherein the angled faces of the plurality of magnet retainers are not smooth.

11. The rotor of claim 1, wherein the magnet retainers comprise fingers that are formed as a single piece with the rotor body.

12. The rotor of claim 1, wherein the magnet retainers extend a distance radially away from the cylindrical surface less than that of each of the separate magnet pieces.

13. The rotor of claim 1, wherein the magnet retainers extend a distance radially away from the cylindrical surface that is substantially the same as a radial height of each of the separate magnet pieces.

\* \* \* \* \*